United States Patent [19]
Reik

[11] Patent Number: 4,729,465
[45] Date of Patent: Mar. 8, 1988

[54] ASSEMBLY FOR COMPENSATING FOR FLUCTUATIONS OF TORQUE WHICH IS TRANSMITTED BY AN INTERNAL COMBUSTION ENGINE

[75] Inventor: Wolfgang Reik, Bühl, Fed. Rep. of Germany

[73] Assignee: Luk Lamellen und Kupplungsbau GmbH, Bühl, Fed. Rep. of Germany

[21] Appl. No.: 885,875

[22] Filed: Jul. 15, 1986

Related U.S. Application Data

[63] Continuation of Ser. No. 669,768, Nov. 8, 1984, abandoned.

[30] Foreign Application Priority Data

Nov. 15, 1983 [DE] Fed. Rep. of Germany ....... 3341443
Mar. 5, 1984 [DE] Fed. Rep. of Germany ....... 3410365

[51] Int. Cl.$^4$ ............................................. F16D 3/14
[52] U.S. Cl. ..................................... 192/106.2; 464/63
[58] Field of Search ................... 192/106.2, 3.28, 3.31, 192/55, 70.17, 70.18, 107 R; 74/574; 464/63, 64, 65, 68

[56] References Cited

U.S. PATENT DOCUMENTS

| | | | |
|---|---|---|---|
| 2,028,951 | 1/1936 | Reed | 192/106.2 |
| 3,266,271 | 8/1966 | Stromberg | 64/27 |
| 4,422,535 | 12/1983 | Ling | 192/3.28 |
| 4,471,863 | 9/1984 | Lech, Jr. | 192/106.2 |
| 4,537,298 | 8/1985 | Loizeau | 192/106.2 |

Primary Examiner—Henry A. Bennet
Attorney, Agent, or Firm—Peter K. Kontler

[57] ABSTRACT

A torsion damping device with two flywheels which are rotatable relative to each other within certain limits and are installed between the crankshaft of the engine and the input element of the change-speed transmission of a motor vehicle. Angular movements of the two flywheels relative to each other are opposed by a set of circumferentially acting coil springs, by a first friction generating device which is operative during each and every stage of angular movement of the flywheels relative to each other, and by a second friction generating device which becomes active only during an advanced stage of angular movement of the flywheels with reference to one another.

34 Claims, 3 Drawing Figures

ASSEMBLY FOR COMPENSATING FOR FLUCTUATIONS OF TORQUE WHICH IS TRANSMITTED BY AN INTERNAL COMBUSTION ENGINE

The is a continuation of my copending patent application Ser. No. 669,768 filed Nov. 8, 1984 and now abandoned.

CROSS-REFERENCE TO RELATED CASE

The torsion damping assembly of the present invention is similar to that which is disclosed in the commonly owned copending patent application Ser. No. 669,770 filed Nov. 8, 1984 by Wolfgang Reik et al. for "Assembly for compensation of fluctuations of torque".

BACKGROUND OF THE INVENTION

The present invention relates to torque transmitting apparatus in general, and more particularly to improvements in assemblies which are designed to compensate for fluctuations of torque which is transmitted by an internal combustion engine. Still more particularly, the invention relates to improvements in assemblies of the type wherein a first rotary unit receives torque from the crankshaft of an internal combustion engine, wherein a second rotary unit receives torque for transmission to the input element of a change-speed transmission in a motor vehicle, and wherein the two units are rotatable, within limits, relative to each other against the opposition of a damper.

It is already known to employ in torsion damping assemblies of the above outlined type a damper which comprises one or more energy storing resilient elements acting in the circumferential direction of the two units as well as a friction generating device. Reference may be had, for example, to German Offenlegungsschrift No. 28 26 274 which discloses a friction generating device having means for opposing each and every stage of angular movement of the two units (each such unit comprises a flywheel) relative to each other. The magnitude of the force which is generated by the friction generating device is constant all the way irrespective of the direction in which one of the flywheels turns relative to the other flywheel and irrespective of the extent of angular movement in either direction. Such mode of opposing angular movements of the two flywheels relative to each other is acceptable in motor vehicles where the fluctuations in the direction and/or magnitude of torque which is transmitted by the engine are relatively small. The just described situation normally prevails in a motor vehicle which is equipped with an Otto engine. However, the situation is quite different if the vehicle embodies a diesel engine which often causes pronounced or very pronouhced fluctuations in the magnitude and/or direction of torque which is transmitted between the crankshaft and the change-speed transmission, i.e., between the prime mover and the wheels of the vehicle. In such motor vehicles, the aforedescribed friction generating device cannot adequately damp fluctuations of torque within the entire load range, i.e., the device cannot adequately assist the resilient elements in properly opposing changes in the angular positions of the two flywheels relative to each other.

OBJECTS AND SUMMARY OF THE INVENTION

An object of the invention is to provide a torsion damping assembly whose damping action can be selected to match the requirements in a particular type of vehicle and which can be used with advantage in vehicles embodying diesel engines.

Another object of the invention is to provide an assembly which can be used as a superior substitute for heretofore known assemblies and wherein the damper which opposes angular movements of the two units relative to each other need not exhibit a uniform resistance during each and every stage of such movements.

A further object of the invention is to provide a simple, compact and inexpensive torsion damping device whose versatility exceeds that of conventional devices and which can be designed for highly satisfactory use in many types of motor vehicles to control and counteract fluctuations of torque which is being transmitted between a prime mover (e.g., a diesel engine) and the change-speed transmission of a motor vehicle.

An additional object of the invention is to provide a novel and improved method of opposing fluctuations of torque which is transmitted between the engine and the transmission of an automobile or a like conveyance.

Still another object of the invention is to provide a novel and improved damper for use between the relatively movable rotary units of a torsion damping device.

The improved torsion damping assembly can be used with particular advantage in motor vehicles to take up and compensate for fluctuations in the transmission of torque and/or for changes in the direction of torque transmission between the internal combustion engine and the input element of the change-speed transmission. The assembly comprises a first rotary unit which serves to receive torque from the engine, and a second rotary unit which is coaxial with the first unit and serves to transmit torque (when necessary) to the input element of the transmission in response to rotation of the first unit. The two units are rotatable clockwise and counterclockwise with reference to each other from a starting position, and the assembly further comprises damper means which is interposed between the two units and serves to yieldably oppose rotation of the two units relative to each other. The damper means comprises a first component which opposes at least a part of angular movement of the units from the starting position (preferably during each and every stage of such angular movement), and a second component which is constructed, mounted and assembled to oppose an advanced (preferably the last) stage of angular movement following an initial stage of movement from the starting position through a predetermined angle. In accordance with a presently preferred embodiment of the invention, each of the two units comprises a discrete flywheel and the damper means is operative to oppose rotation of the two flywheels relative to each other. The first component of the damper means preferably comprises energy storing resilient elements acting in the circumferential direction of the two units and/or friction generating means. The second component preferably comprises a friction generating device.

The just mentioned friction generating device which forms part of or constitutes the second component of the damper means comprises means for opposing rotation of the one and/or the other unit from the starting position in either direction as soon as the unit completes the initial stage of its movement in one of the two directions. The extent of initial angular movement in one direction may but need not be the same as the extent of angular movement in the other direction.

The friction generating device can be integrated into the first component of the damper means. For example, the first component can comprise a set of energy storing resilient elements in the form of coil springs which act in the circumferential direction of the two units, and the friction generating device can comprise means which causes at least one coil spring of the first component to store additional energy during the advanced stage of angular movement of the units from the starting position. The resilient element or elements of the first component of the damper means can be designed to urge the two units to the starting position, and the friction generating device can comprise an element (e.g., a disc with prongs extending into arcuate slots of one of the units) which is moved by one of the units from a first position to a second position in response to movement of the two units through the initial stage of angular movement, and the resilient element or elements of the first component are then operative to return the element of the friction generating device from the second to the first position when the resilient element or elements of the first component are free to return the two units to the starting position.

Means is preferably provided for limiting the extent of angular movement of the two units relative to each other, and the aforementioned advanced stage preferably constitutes the last stage of movement of the two units in either direction from the starting position toward the corresponding one of the two end positions which are imposed by the limiting means.

The novel features which are considered as characteristic of the invention are set forth in particular in the appended claims. The improved torsion damping assembly itself, however, both as to its construction and mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
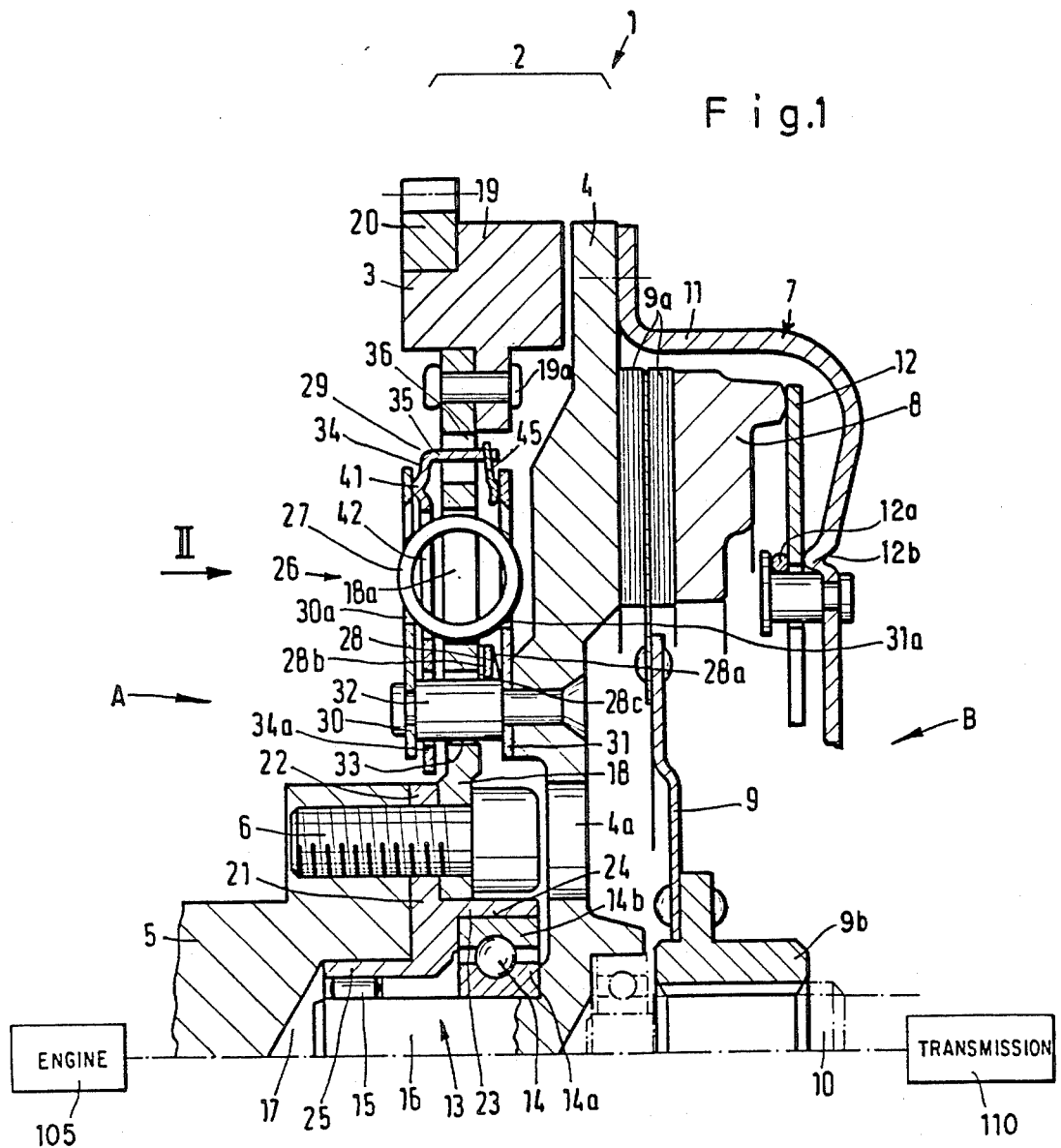
FIG. 1 is a fragmentary axial sectional view of a torsion damping assembly which embodies the invention.
Figure 2:
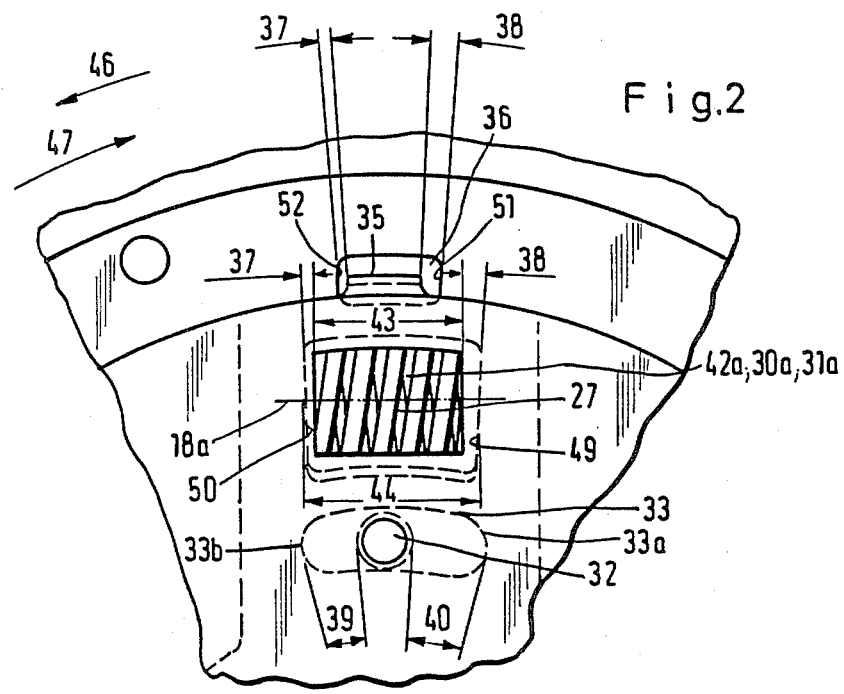
FIG. 2 is a fragmentary end elevational view as seen in the direction of arrow II in FIG. 1.

The torsion damping assembly 1 which is shown in FIGS. 1 and 2 comprises a first unit A receiving torque from the internal combustion engine 105 and a second unit B serving to transmit torque to the input element 10 of a change-speed transmission 110 in a motor vehicle. The assembly 1 is designed to compensate for shocks, particularly those which develop as a result of fluctuations in the RPM of a crankshaft 5 which is driven by the engine 105 and forms part of the unit A. The unit A is coaxial with the unit B and further comprises a flywheel 3. The unit B comprises a second flywheel 4 and a friction clutch 7 which can be engaged to transmit torque from the flywheel 4 to the input element 10 of the transmission 110. The flywheels 3 and 4 together constitute a composite flywheel 2 and are angularly movable, within limits, relative to each other from a neutral or starting position which is shown in FIG. 2. The flywheel 3 is separably affixed to the crankshaft 5 by an annulus of bolts 6 or analogous fasteners of which only one can be seen in FIG. 1.

The friction clutch 7 comprises a housing or cover 11 which is attached to and rotates with the flywheel 4, an axially movable pressure plate 8 which is installed in the housing 11, a clutch disc 9 which is installed between the flywheel 4 and the pressure plate 8 and has an internally splined hub 9b surrounding an externally splined portion of the input element 10, and a diaphragm spring 12 which is tiltable between two seats 12a, 12b on the housing 11 and biases the clutch plate 8 in a direction to the left, as viewed in FIG. 1, when the clutch 7 is engaged. The pressure plate 8 then bears against the adjacent friction lining 9a of the clutch disc 9 and urges the other lining 9a into engagement with the adjacent side of the flywheel 4. The means (not shown) for disengaging the clutch 7 (i.e. for interrupting the transmission of torque between the flywheel 4 and the input element 10 of the transmission 110) comprises a suitable bearing or the like which can engage the radially inwardly extending prongs of the diaphragm spring 12 in order to tilt the latter between the seats 12a, 12b so that the spring 12 ceases to bear against the clutch plate 8 which releases the clutch disc 9 and thus allows the flywheel 4 to rotate relative to the input element 10.

A system 13 of bearings is interposed between the flywheels 3 and 4 so as to facilitate their angular movements through a predetermined angle. The system 13 comprises a radial antifriction bearing 14 and a needle bearing 15. The bearings 14 and 15 are disposed side by side, as considered in the axial direction of the units A and B. The central portion of the flywheel 4 has a protuberance in the form of an elongated cylindrical stub 16 which is surrounded by the bearings 14 and 15. The inner race 14a of the bearing 14 is non-rotatably affixed to the protuberance 16 whose left-hand end portion (as viewed in FIG. 1) extends into a centrally located recess 17 of the crankshaft 5. The rolling elements of the needle bearing 15 are disposed in the recess 17 of the crankshaft 5 close to the end face of the protuberance 16.

The flywheel 3 is assembled of several sections including a flange 18 the radially outermost portion of which is connected to an annular rim 19 by rivets 19a. The rim 19 carries the ring-shaped starter gear 20. The flywheel 3 further comprises a centrally located coupling section 21 including a disc-shaped part 22 between the radially innermost portion of the flange 18 and the end face of the crankshaft 5, a first annular portion or sleeve 25 which surrounds the rolling elements of the needle bearing 15 in the recess 17 of the crankshaft 5, and a second annular portion or sleeve 23 which surrounds the outer race 14b of the bearing 14. The bolts 6 connect the flange 18 to the disc-shaped part 22 of the coupling section 21 as well as to the crankshaft 5. The sleeve 23 extends axially in a direction away from the crankshaft 5 and the sleeve 25 extends in the opposite direction. A circumferentially complete groove 24 in the internal surface of the sleeve 23 receives the outer race 14b of the bearing 14 in such a way that the race 14b cannot rotate with reference to the coupling section 21. The sleeve 25 constitutes the outer race of the needle bearing 15 whose inner race is the adjacent end portion of the protuberance 16. The sleeve 25 further serves as a means for centering the flywheel 3 with reference to the crankshaft 5.

The radially extending flange of the flywheel 4 has apertures 4a in register with the heads of the bolts 6 so that such bolts can be readily applied or removed to thus facilitate the assembling of the units A and B or their separation from one another. The units A and B are preferably assembled with one another and with the bearing system 13 prior to affixing of the flywheel 3 to the crankshaft 5.

The assembly 1 further comprises a composite damper 26 which yieldably opposes the aforementioned limited angular movement of the flywheels 3 and 4 (i.e., of the units A and B) from the starting or neutral position. In the illustrated embodiment, the damper 26 includes a first component having a set of circumferentially acting energy storing resilient elements in the form of coil springs 27 (one shown in each of FIGS. 1 and 2) and a friction generating device 28. The second component of the damper 26 includes a second friction generating device 29. The flange 18 of the flywheel 3 constitutes a means for transmitting stresses from the crankshaft 5 to the components 27–28 and 29 of the damper 26. This flange is flanked by two discs 30, 31 which are held at a predetermined distance from each other and are rigidly secured to the flywheel 4 by distancing elements in the form of rivets 32 (only one shown in FIG. 1), i.e., the discs 30 and 31 are parts of the second unit B. The flange 18 has a set of windows 18a, one for each coil spring 27, and simular windows 30a, 31a are respectively provided in the discs 30 and 31. Each of the coil springs 27 is received in the corresponding window 18a as well as in the adjacent windows 30a and 31a.

The extent to which the flywheels 3 and 4 can move angularly relative to each other (clockwise and counterclockwise from the starting or neutral positions) is determined by the distancing elements 32 in conjunction with the surfaces bounding arcuate slots 33 in the flange 18 of the flywheel 3. As can be seen in FIG. 1, the median portion of the illustrated distancing element 32 extends through the corresponding arcuate slot 33. FIG. 2 shows the concave end portions 33a, 33b of the surface bounding one of the slots 33; such end portions are engaged by the respective distancing element 32 in the corresponding end positions of the flywheels 3, 4 relative to each other.

The friction generating device 28 is designed to yieldably oppose rotation of the flywheels 3 and 4 during each and every stage of angular movement of the units A and B from one another, i.e., while the flywheel 4 leaves the neutral position of FIG. 2 (in which the illustrated distancing element 32 is remote from and can be located at least substantially midway between the end portions 33a and 33b of the surface surrounding the corresponding slot 33) and moves clockwise or counterclockwise until the distancing element 32 engages the end portion 33a or 33b. The device 28 operates between the flange 18 of the flywheel 3 and the discs 30, 31 of the unit B. As can be seen in FIG. 1, the device 28 comprises a diaphragm spring 28a which reacts against the disc 31 and urges a friction generating ring 28c against the adjacent side of the flange 18 through the medium of a washer 28b. The bias of the spring 28a is selected with a view to ensure that the ring 28c engages the adjacent surface of the flange 18 with a predetermined force i.e., that the device 28 offers a predetermined resistance to rotation of the units A and B relative to each other regardless of whether the flywheel 3 is rotated relative to the flywheel 4 and/or vice versa.

The friction generating device 29 (second component of the damper 26) comprises a disc-shaped element 34 the radially outermost portion of which is provided with axially extending projections or arms 35 received in the openings or cutouts 36 of the flange 18. The length of the openings 36 (as considered in the circumferential direction of the flywheel 3) is such that the arms 35 have a certain freedom of angular movement relative to the flange 18, i.e., relative to the unit A. The extent of angular movement of the arm 35 which is shown in the upper part of FIG. 2 from a first position to a second position in a counterclockwise direction is shown at 37, and the extent of angular movement to a second position in the clockwise direction is indicated at 38. The maximum extent of angular displacement of the flywheel 4 relative to the flywheel 3 from the neutral position in a clockwise direction, as viewed in FIG. 2, is shown at 39 (see FIG. 3), and the maximum extent of angular movement of the flywheel 4 relative to the flywheel 3 from the neutral position in a counterclockwise direction, as viewed in FIG. 2, is shown at 40 (see FIG. 3). The flywheel 4 turns in the direction of arrow 47 during coasting and in the direction of arrow 46 when the engine 105 drives the wheels of the vehicle through the medium of the transmission 110.

The disc-shaped element 34 of the friction generating device 29 further comprises an annular corrugation 41 which is disposed radially inwardly of the projections or arms 35 and is in frictional engagement with the disc 30 of the unit B. That portion (34a) of the disc-shaped element 34 which extends radially inwardly beyond the corrugation 41 has cutouts or windows 42 for the coil springs 27 of the first component of the damper 26. As can be seen in FIG. 2, the length 43 of the window 42 in the element 34 (as considered in the circumferential direction of the units A and B) is the same as that of the corresponding windows 30a, 31a in the discs 30, 31 of the unit B. The length 44 of the window 18a (again as considered in the circumferential direction of the units A, B) exceeds the length 43. The difference between the lengths 43, 44 and the positions of the windows 30a, 31a, 42 relative to the corresponding window 18a of the flange 18 are selected in such a way that the discs 30, 31 and the flange 18 can move relative to each other through the angle 37 or 38, depending upon the direction of rotation (arrow 46 or 47) of the flywheel 4 relative to the flywheel 3 before the coil spring 27 is caused to store energy (or to store additional energy) as a result of angular movement of the discs 30, 31 and flange 18 relative to each other.

The tips of the arms 35 on the disc-shaped element 34 of the friction generating device 29 are acted upon by the radially outermost portion of a diaphragm spring 45 which is installed between the flange 18 and the disc 31 and whose radially innermost portion reacts against the disc 31. Thus, the spring 45 biases the element 34 in a direction to the left, as viewed in FIG. 1, and causes the corrugation 41 to remain in requisite frictional engagement with the adjacent side of the disc 30.

The windows 30a, 31a of the discs 30, 31, the windows 18a of the flange 18 and the coil springs 27 are distributed (as considered in the circumferential direction of the units A, B) and dimensioned in such a way that the damper 26 exhibits a composite (multistage) characteristic curve. This will be explained with reference to FIG. 3 wherein the extent of angular movement of the flywheels 3, 4 relative to each other is measured along the abscissa and the magnitude of torque which is transmitted between the two flywheels is measured along the ordinate. The arrow 46 indicates the direction in which the flywheels 3 and 4 rotate when the crankshaft 5 transmits torque to the input element 10 of the transmission 110 in order to rotate the wheels of the motor vehicle. The direction in which the flywheels 3 and 4 rotate during coasting of the vehicle is indicated by the arrow 47. The solid-line curve of FIG. 3 denotes the damping action of the springs 27, and the hatched areas 48 and 48a denote the frictional damping action which is superimposed upon the characteristic curve of the coil springs 27 and is furnished by the device 29.

FIG. 2 shows the parts of the damper 26 in their idle positions. If the flywheel 4 is thereupon rotated relative to the flywheel 3 (or vice versa) in the direction of arrow 46, the flywheel 4 or 3 first encounters resistance by the weakest coil spring 27 or by a set of two or more weakest coil springs. This is the first stage of operation of the damper 26. When the flywheel 4 covers the angle 38 in the direction of arrow 46, its further angular movement in such direction is opposed by one or more stronger coil springs (including the coil spring 27 which is shown in FIG. 2) as well as by the aforementioned weakest spring or springs. This is the second stage of operation of the damper 26. The illustrated coil spring 27 (and, if necessary, one or more additional coil springs which are mounted in the same way) starts to oppose further rotation of the flywheel 4 in the direction of arrow 46 because the edge face 49 in the window 18a of the flange 18 then engages the adjacent end convolution of the illustrated (stronger) spring 27. If the flywheel 4 is rotated in the direction of arrow 47, the leftmost convolution of the coil spring 27 shown in FIG. 2 is engaged by the edge face 50 in the window 18a of the flange 18 after the flywheel 4 completes a movement through the angle 37.

The distancing elements 32 and the surfaces bounding the respective slots 33 determine the maximum extent of angular movement of the flywheel 4 with reference to the flywheel 3 in the direction of arrow 46 or 47. When the flywheel 4 completes a movement through the angle 40 while rotating in the direction of arrow 46, the flywheel 3 is compelled to share all further angular movements of the flywheel 4 in the direction of arrow 46 because the distancing elements 32 then engage the end portions 33b of the respective surfaces. Analogously, the flywheels 3 and 4 must rotate as a unit when the flywheel 4 completes an angular movement through the angle 39 in the direction of arrow 47 because the distancing elements 32 then engage the end portions 33a of the respective surfaces.

When the flywheel 3 or 4 leaves the neutral or starting position of FIG. 2 in the direction of arrow 46 or 47, the friction generating device 28 immediately begins to oppose such movement and continues to oppose the movement until the distancing elements 32 engage the end portions 33a or 33b of surfaces in the respective slots 33. The action of the device 28 is assisted by the device 29 as soon as the arms 35 of the disc-shaped element 34 of the friction generating device 29 reach the respective ends of the openings 36 in the flange 18 of the flywheel 3 so that the element 34 cannot rotate any longer relative to the unit A or B. Thus, the arms 35 must engage the edge faces 51 or 52 in the respective openings 36 of the flange 18 before the device 29 begins to cooperate with the device 28. At such time, the element 34 and the associated diaphragm spring 45 cannot turn with reference to the flange 18 of the flywheel 3. Consequently, and if the flywheel 4 continues to turn relative to the flywheel 3 or vice versa, the parts 30 and 34 move relative to each other and the corrugation 41 of the element 34 slides along the adjacent side of the disc 30. Thus, the friction generating device 29 is active during that advanced stage of rotation of the flywheels 3 and 4 relative to each other when the relative angular movement takes place subsequent to engagement between the arms 35 and the respective edge faces 51 or 52. As explained above, the angular movement of the flywheels 3 and 4 relative to each other is terminated automatically when the distancing elements 32 engage the end portions 33a or 33b of the surfaces in the respective slots 33 of the flange 18. The rather pronounced friction which is generated by the damper 26 during the just discussed advanced stage of clockwise or counterclockwise movement of the flywheel 3 relative to the flywheel 4 is denoted in FIG. 3 by the hatched areas 48 and 48a. Such pronounced friction is attributable to the provision of the friction generating device 29.

Figure 3:
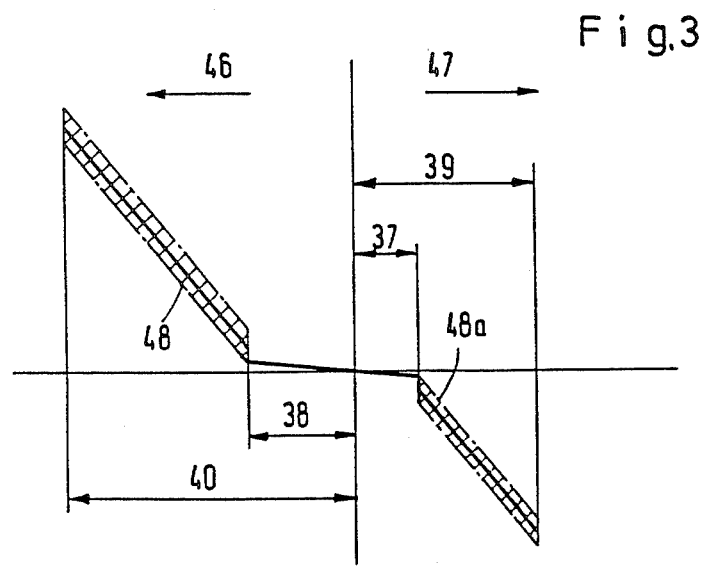
FIG. 3 is a graph showing the characteristic damping curve of the assembly which is shown in FIGS. 1 and 2.

FIG. 3 further shows that the energy which the coil springs 27 store during movement of the distancing elements 32 into engagement with the end portions 33a or 33b of the surfaces in the respective slots 33 of the flange 18 suffices to ensure return movement of the flywheels 3 and 4 to their neutral or starting positions of FIG. 2. However, it is also possible to employ relatively weak coil springs so that their restoring force does not suffice to ensure return movement of the flywheels 3 and 4 all the way to the positions of FIG. 2. This entails a certain shifting of that advanced stage of angular movement of the flywheels 3 and 4 relative to each other when the friction generating device 29 is operative to assist the friction generating device 28 and the coil springs 27 in opposing angular movements of the flywheels relative to each other.

It is also possible to construct the assembly 1 in such a way that the windows 42 of the disc-shaped element 34 are longer (as considered in the circumferential direction of the units A and B) than the windows 30a, 31a of the discs 30, 31. This also entails a certain shifting of the advanced stage during which the friction generating device 29 cooperates with the coil springs 27 and the friction generating device 28.

FIG. 3 does not specifically show the frictional hysteresis which is generated by the device 28 because (in the illustrated embodiment) the resistance which the device 28 offers to rotation of the flywheels 3 and 4 relative to each other is much less pronounced than that which is offered by the device 29 during the corresponding advanced stage of angular movement of the flywheels 3 and 4 with reference to each other.

An important advantage of the friction generating device 29 is that the versatility of the torsion damping assembly 1 is enhanced in a simple but highly effective way, i.e., that the assembly 1 can be designed to ensure that the resistance to angular movement of the units A and B relative to each other is not very pronounced during that stage or those stages of rotation which do not necessitate a pronounced resistance but that the resistance is automatically increased when the extent of angular movement of the two units relative to each other reaches that advanced stage when the increased resistance to fluctuations of torque is desirable and advantageous. The ability of the assembly 1 to offer different resistances to rotation of the units A and B relative to each other is achieved in a very simple way, and such increased versatility of the assembly is not achieved at the cost of appreciably increasing its bulk, weight and/or cost.

The device 29 can be said to constitute a load-depending friction generating arrangement because it remains inactive during the initial stage or stages of movement of the flywheels 3 and 4 relative to each other but is automatically actuated when the initial stage of movement is completed, i.e., when the angular movement of the flywheels 3 and 4 relative to each other reaches that advanced stage during which a more pronounced resistance to angular movements of the flywheels relative to each other is desirable and beneficial to the comfort of the occupant(s) of the vehicle and/or to the useful life and integrity of the parts of the conveyance.

Integration of the friction generating device 29 into the component including the coil springs 27 and the friction generating device 28 also contributes to automatic activation of the device 29 at the optimum stage of angular movement of the flywheels 3 and 4 relative to each other. In the illustrated embodiment, the device 29 is integrated into the component including the coil springs 27 and the friction generating device 28 in that the windows 42 of the disc-shaped element 34 of the device 29 receive portions of the coil springs 27.

The ability of the coil springs 27 (or at least some of these coil springs) to return the flywheel 3 and/or 4 to its starting position as soon as such coil springs are free to turn the unit A relative to the unit B and/or vice versa ensures that the device 29 is always ready for operation at an opportune time (i.e., during the selected advanced stage of rotation of the units A and B relative to each other) when the parts of the assembly 1 assume the positions which are shown in FIG. 2. As mentioned above, complete resetting of the flywheels 3 and 4 to their starting positions is not always desired or advantageous; this can be determined by the simple expedient of properly selecting the characteristics of and/or the initial stress upon one or more coil springs 27.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A torsion damping assembly, particularly for taking up and compensating for fluctuations in the transmission of torque between the internal combustion engine and the change-speed transmission of a motor vehicle, comprising a first rotary unit arranged to receive torque from the engine; a second rotary unit coaxial with said first unit and arranged to transmit torque to the transmission in response to rotation of said first unit, said first and second units respectively comprising first and second flywheels and being rotatable with reference to each other form a starting position; and damper means operating between said units and arranged to yieldably oppose rotation of said units with reference to each other, said damper means including a first component including energy storing resilient means acting in the circumferential direction of said units and said first component being arranged to oppose at least a part of angular movement of said units from said starting position, and a second component arranged to oppose an advance stage of said angular movement following an initial stage of said angular movement from said starting position through a predetermined angle, said second component including a friction generating device and having at least one window for a portion of said resilient means.

2. The assembly of claim 1, wherein said damper means is interposed between said flywheels.

3. The assembly of claim 1, wherein each of said units is rotatable relative to the other unit in a clockwise and counterclockwise direction and said friction generating device comprises means for opposing such rotation following said initial stage in each of said directions.

4. The assembly of claim 3, wherein the extent of angular movement during the initial stage of movement of a unit in one of said directions is different from the extent of angular movement during the initial stage of movement of such unit in the other of said directions.

5. The assembly of claim 1, wherein said friction generating device is integrated into the first component of the damper means.

6. The assembly of claim 5, wherein said energy storing resilient means comprises a set of energy storing resilient elements acting in the circumferential direction of said units and said friction generating device is arranged to cause at least one of said resilient elements to store additional energy during said advanced stage of angular movement of said units relative to each other.

7. The assembly of claim 1, wherein said resilient means includes means for urging said units to said starting position.

8. The assembly of claim 7, wherein said friction generating device includes an element which is moved by one of said units from a first position to a second position in response to movement of said units through the initial stage of said angular movement and wherein said resilient means is operative to return said element to the first position when such resilient means is free to return said units to their starting position.

9. The assembly of claim 1, further comprising means for limiting the extent of angular movement of said units relative to each other, said advanced stage constituting the last stage of movement of said units in either direction from said starting position toward the end positions imposed by said limiting means.

10. Apparatus for compensating for shocks, particularly for compensating for fluctuations of torque in a motor vehicle having an engine and a change-speed transmission, comprising a plurality of flywheels including a first flywheel arranged to receive torque from the engine and a second flywheel connectable with the change-speed transmission, said first and second flywheels being coaxial with and being rotatable relative to each other in first and second directions from a neutral position; and damper means including energy storing resilient means acting in the circumferential direction of said flywheels and friction generating means including at least one substantially disc-shaped element in force-locking engagement with one of said first and second flywheels and in form-locking engagement with the other of said first and second flywheels, said element and said other flywheel having limited freedom of angular movement relative to each other and said damper means being arranged to yieldably oppose rotation of said first and second flywheels relative to each other from said neutral position, said element being engaged by said other flywheel upon completion of angular movement through a predetermined angle from said neutral position in at least one of said directions and said resilient means benig arranged to engage said element at least upon a reversal of rotation of said first and second flywheels relative to each other.

11. The apparatus of claim 10, wherein said element has means for frictionally opposing rotation of said first and second flywheels relative to each other at least during a portion of rotation of the first and second flywheels back to said neutral position.

12. The apparatus of claim 10, wherein said resilient means includes a plurality of energy storing components at least one of which abuts and is in force locking engagement with said element during a portion at least of rotation of said first and second flywheels back to said neutral position, and further comprising an abutment provided on one of said first and second flywheels and being in form locking engagement with said element during said portion of rotation of said first second flywheels back to said neutral position so that said element is then clamped between such abutment and said one component.

13. The apparatus of claim 10, wherein said energy storing resilient means includes means for opposing rotation of said first and second flywheels in each of said directions but through different angles.

14. The apparatus of claim 10, wherein said energy storing resilient means includes a component which is disengaged from said element during a first stage of rotation and engages said element during a second stage of rotation of said first and second flywheels relative to each other, the angular displacement of said first and second flywheels relative to each other during said first stage being equal to or approximating the extent of said limited freedom of angular movement of said element and said other flywheel relative to each other.

15. The apparatus of claim 10, further comprising two substantially disc-shaped members affixed to one of said first and second flywheels and having registering windows, said resilient means including at least one spring extending substantially tangentially of said flywheels and being installed in said windows, the other of said first and second flywheels having a section which is disposed between said disc-shaped members and includes portions disposed radially of said flywheels and flanking said spring.

16. The apparatus of claim 15, wherein said element has at least one window which receives a portion of said spring and the length of said at least one window equals the length of windows in said disc-shaped members as seen in the circumferential direction of said flywheels.

17. The apparatus of claim 15, wherein said element includes at least one window for a portion of said spring and the length of the window in said element in the circumferential direction of said flywheels exceeds the length of windows in said disc-shaped members.

18. The apparatus of claim 15, wherein said portions of said section flank at least one window which is provided in said section for a portion of said spring and said spring is spaced apart from one of said portions of said section in one of said directions in the neutral position of said first and second flywheels.

19. A torsion damping assembly, particularly for taking up and compensating for fluctuations in the transmission of torque between the internal combustion engine and the change-speed transmission of a motor vehicle, comprising a first rotary unit arranged to receive torque from the engine; a second rotary unit coaxial with said first unit and arranged to transmit torque to the transmission in response to rotaton of said first unit, said first and second units respectively comprising first and second flywheels and being rotatable with reference to each other from a starting position; and damper means operating between said units and arranged to yieldably oppose rotation of said units with reference to each other, said damper means including a first component including energy storing resilient means acting in the circumfrential direction of said units and friction generating means and said first component being arranged to oppose at least a part of angular movement of said units from said starting position, and a second component arranged to oppose an advanced stage of said angular movement following the initial stage of said angular movement from said starting position through a predetermined angle, said second component including a friction generating device and having at least one window for a portion of said resilient means.

20. The assembly of claim 19 wherein said damper means is interposed between said flywheels.

21. The assembly of claim 19, wherein each of said units is rotatable relative to the other unit in a clockwise and counterclockwise direction and said friction generating device comprises means for opposing such rotation following said initial stage in each of said directions.

22. The assembly of claim 21, wherein the extent of angular movement during the initial stage of movement of a unit in one of said directions is different from the extent of angular movement during the initial stage of movement of such unit in the other of said directions.

23. The assembly of claim 19, wherein said friction generating device is integrated into the first component of the damper means.

24. The assembly of claim 23, wherein said energy storing resilient means comprises a set of energy storing resilient elements acting in the circumferential direction of said units and said friction generating device is arranged to cause at least one of said resilient elements to store additional energy during said advanced stage of angular movement of said units relative to each other.

25. The assembly of claim 19, wherein said resilient means includes means for urging said units to said starting position.

26. The assembly of claim 19, wherein said friction generating device includes an element which is moved by one of said units from a first position to a second position in response to movement of said units through the initial stage of said angular movement and wherein said resilient means is operative to return said element to said first position when such resilient means is free to return said units to their starting position.

27. The assembly of claim 19, further comprising means for limiting the extent angular movement of said units relative to each other, said advanced stage constituting the last stage of movement of said units in either direction from said starting position toward the end positions imposed by said limiting means.

28. The assembly of claim 1, wherein said second component includes at least one projection and one of said rotary units has an opening receiving said projection with play in the circumferential direction of said units.

29. The assembly of claim 21, wherein at least a portion of said at least one projection is at least substantially parallel to the axes of said rotary units.

30. The assembly of claim 21 wherein said opening is provided in said first rotary unit.

31. The assembly of claim 19, wherein said second component includes at least one projection and one of said rotary units has an opening receiving said projection with play in the circumferential direction of said units.

32. The assembly of claim 31, wherein at least a portion of said at least one projection is at least substantially parallel to the axes of said rotary units.

33. The assembly of claim 31, wherein said opening is provided in said first rotary unit.

34. A torsion damping assembly, particularly for taking up and compensating for fluctuations in the transmission of torque between the internal combustion engine and the change-speed transmission of a motor vehicle, comprising a first rotary unit arranged to receive torque from the engine; a second rotary unit coaxial with said first unit and arranged to transmit torque to the transmission in response to rotation of said first unit, said first and second units respectively comprising first and second flywheels and being rotatable with reference to each other from a starting position; and damper means operating between said units and arranged to yieldably oppose rotation of said units with reference to each other, said damper means including a first component including energy storing resilient means acting in the circumferential direction of said units and said first component being arranged to oppose at least a part of angular movement of said units from said starting position, and a second component arranged to oppose an advanced stage of said angular movement following an initial stage of said angular movement from said starting position through a predetermined angle, said second component including a friction generating device and having at least one projection, said first rotary unit having an opening receiving said at least one projection with play in the circumferential direction of said rotary units.

* * * * *